United States Patent
Hunukumbure

(10) Patent No.: US 9,705,576 B2
(45) Date of Patent: *Jul. 11, 2017

(54) MIMO WIRELESS COMMUNICATION SYSTEM

(71) Applicant: FUJITSU LIMITED, Kawasaki-shi, Kanagawa (JP)

(72) Inventor: Rajaguru Mudiyanselage Mythri Hunukumbure, Hillingdon (GB)

(73) Assignee: FUJITSU LIMITED, Kawasaki (JP)

( * ) Notice: Subject to any disclaimer, the term of this patent is extended or adjusted under 35 U.S.C. 154(b) by 79 days.

This patent is subject to a terminal disclaimer.

(21) Appl. No.: 14/681,711

(22) Filed: Apr. 8, 2015

(65) Prior Publication Data
US 2015/0215016 A1 Jul. 30, 2015

Related U.S. Application Data

(63) Continuation of application No. PCT/EP2014/050844, filed on Jan. 16, 2014.

(30) Foreign Application Priority Data

Jan. 21, 2013 (EP) .................................... 13152050

(51) Int. Cl.
  H04B 7/04 (2017.01)
  H04B 15/00 (2006.01)
  (Continued)

(52) U.S. Cl.
  CPC ........... H04B 7/0456 (2013.01); H04B 15/00 (2013.01); H04L 5/0023 (2013.01);
  (Continued)

(58) Field of Classification Search
  None
  See application file for complete search history.

(56) References Cited

U.S. PATENT DOCUMENTS 8,190,094 B2 5/2012 Kim et al.
8,867,477 B2 10/2014 Song et al.
(Continued)

FOREIGN PATENT DOCUMENTS

EP 2 051 401 4/2009
EP 2 717 508 4/2014
(Continued)

OTHER PUBLICATIONS

"LTE; Evolved Universal Terrestrial Radio Access (E-UTRA); Physical channels and modulation; (3GPP TS 36.211 version 10.4.0 Release 10)", ETSI TS 136 211, vol. 10.4.0, Jan. 2012, 103 Pages.
(Continued)

*Primary Examiner* — Robert C Scheibel
(74) *Attorney, Agent, or Firm* — Staas & Halsey LLP

(57) ABSTRACT

In a LTE-based wireless communication system, a first user ($UE_B$) in a first cell (Cell A) may experience significant interference from downlink transmissions in a second cell (Cell B). Interference can be reduced by selecting a precoder for downlink transmission to a second user ($UE_A$) in the first cell which will result in reduced interference to the first user ($UE_B$) after the first user ($UE_B$) is handed-over to the second cell. The uplink/downlink channel reciprocity in TDD systems and the new transmission mode TM9 in LTE Release 10 are exploited to obtain channel information and determine precoding. After handover to the second cell, a resource allocation ($RB_B$) to the first user ($UE_B$) is notified to the first cell. In the first cell, the second user ($UE_A$) receives the same resource allocation and a precoder selected to reduce interference to the first user.

15 Claims, 7 Drawing Sheets

(51) Int. Cl.
 *H04L 5/14* (2006.01)
 *H04B 7/0456* (2017.01)
 *H04L 5/00* (2006.01)
 *H04L 25/03* (2006.01)
 *H04W 88/08* (2009.01)

(52) U.S. Cl.
 CPC .......... *H04L 5/0073* (2013.01); *H04L 5/1438* (2013.01); *H04L 25/03891* (2013.01); *H04W 88/08* (2013.01)

(56) References Cited

U.S. PATENT DOCUMENTS

| | | | |
|---|---|---|---|
| 9,338,721 B2* | 5/2016 | Hunukumbure | H04L 5/0023 |
| 2007/0248172 A1* | 10/2007 | Mehta | H04B 7/024 375/260 |
| 2012/0014458 A1 | 1/2012 | Lee et al. | |
| 2012/0093078 A1 | 4/2012 | Perlman et al. | |
| 2013/0021991 A1* | 1/2013 | Ko | H04B 7/0413 370/329 |
| 2013/0114498 A1* | 5/2013 | Park | H04W 4/06 370/312 |

FOREIGN PATENT DOCUMENTS

| | | |
|---|---|---|
| JP | 2010-537520 | 12/2010 |
| KR | 10-2011-0038660 | 4/2011 |
| WO | WO 2011/013887 | 2/2011 |
| WO | 2011/035201 | 3/2011 |
| WO | 2012/097936 | 7/2012 |

OTHER PUBLICATIONS

"LTE; Evolved Universal Terrestrial Radio Access (E-UTRA); Physical layer procedures", 3GPP TS 36.213 Release 10, ETSI TS 136 213, vol. 10.5.0, Mar. 2012, 127 Pages.

Mueller, "IEEE 802.16m Technology Introduction, White Paper", Rohde & Schwarz, Jul. 2010, pp. 1-41.

Sesia et al., "LTE—The UMTS, Long Term Evolution From Theory to Practice", Wiley, Second Edition, 2011; 794 Pages.

European Search Report issued on Apr. 16, 2013 in corresponding European Patent Application No. 13152050.4.

Japanese Office Action dated Jan. 24, 2016 in Japanese Patent Application No. 2015-553081.

\* cited by examiner

RELATED ART

MIMO WIRELESS COMMUNICATION SYSTEM

CROSS-REFERENCE TO RELATED APPLICATIONS

This application claims the benefit of International Application No. PCT/EP2014/050844, filed Jan. 16, 2014, in the PCT Patent Office, and European Application No. 13152050.4, filed Jan. 21, 2013 in the European Intellectual Property Office the disclosures of which is incorporated herein by reference

BACKGROUND

1. Field

The present invention relates to wireless communication systems, and more particularly to wireless communication systems having multiple-input, multiple-output (MIMO) capability, especially but not exclusively Orthogonal Frequency Division Multiple Access (OFDMA) systems including those compliant with the LTE (Long Term Evolution) and LTE-A groups of standards.

2. Description of the Related Art

Wireless communication systems are widely known in which a base station (BS) communicates with multiple subscriber stations (SS or MS, also called users) within range of the BS. The area covered by one BS is called a cell and typically, many base stations are provided in appropriate locations so as to cover a wide geographical area more or less seamlessly with adjacent cells. Each BS divides its available bandwidth, i.e. frequency and time resources, into individual resource allocations for the users. There is a constant need to increase the capacity of such systems in order to accommodate more users and/or more data-intensive services.

OFDM (Orthogonal Frequency Division Multiplex) is one known technique for transmitting data in a wireless communication system. An OFDM based communications scheme divides data symbols to be transmitted among a large number of subcarriers (also called frequency fingers) which are equally spaced in frequency, hence frequency division multiplexing. By carrying only a small amount of data on each subcarrier, the bit rate per subcarrier is kept low and hence intersymbol interference is reduced. Data is modulated onto a subcarrier by adjusting its phase, amplitude, or both phase and amplitude.

The "orthogonal" part of the name OFDM refers to the fact that the spacings of the subcarriers are specially chosen so as to be orthogonal, in a mathematical sense, to the other subcarriers. More precisely, they are arranged along the frequency axis such that the sidebands of adjacent subcarriers are allowed to overlap but can still be received without inter-subcarrier interference, commonly referred to as ICI. In mathematical terms, the sinusoidal waveforms of each subcarrier are called eigenfunctions of a linear channel, with the peak of each sinusoid coinciding with a null of every other sinusoid. This can be achieved by making the subcarrier spacing a multiple of the reciprocal of the symbol period.

When individual subcarriers or sets of subcarriers are assigned to different users of the wireless communication system, the result is a multi-access system referred to as OFDMA. (In this specification, the term OFDM is henceforth used to include OFDMA). By assigning distinct frequency/time resources to each user in a cell, OFDMA can substantially avoid interference among the users within a cell. However, interference from adjacent cells can still be a problem as explained later.

A further modification of the basic OFDM scheme is called MIMO OFDM, where MIMO stands for multiple-input multiple-output. This scheme employs multiple antennas (or antenna ports, see below) at both the transmitter and the receiver to enhance the data capacity achievable between the BS and each user. For example, a 4×4 MIMO channel is one in which transmitter and receiver communicate with one another each using four antennas. There is no need for the transmitter and receiver to employ the same number of antennas. Typically, a base station in a wireless communication system will be equipped with many more antennas in comparison with a mobile handset, owing to differences in power, cost and size limitations.

Considering the simplest example of a transmitter (e.g. base station) communicating with a single receiver (subscriber station), the MIMO channel is the frequency (or equivalently time delay) response of the radio link between the transmitter and receiver. It contains all the sub-carriers, and covers the whole bandwidth of transmission. A MIMO channel contains many individual radio links, hence it has Nt×Nr SISO (Single-Input Single-Output) channels (also called sub-channels). For example, a 2×2 MIMO arrangement contains 4 links and hence 4 SISO channels. The SISO channels can be combined in various ways to transmit one or more data streams to the receiver.

FIG. 1 is a conceptual diagram of a generalized MIMO system. In FIG. 1, a transmitter transmits signals utilizing Nt transmitting antennas, and the receiver receives the signals from the transmitter utilizing Nr receiving antennas. The characteristics of the individual SISO channels or subchannels between the transmitter and receiver are denoted by $H_{0,0}$ to $H_{Nr-1, Nt-1}$, and as indicated in the Figure, these form terms of a matrix called the channel matrix or channel response matrix H. "$H_{0,0}$" indicates the channel characteristics (for example, channel frequency response) for transmitting signals from the transmitting antenna 0 to the receiving antenna 0. "$H_{Nr-1, Nt-1}$" indicates the channel characteristics for transmitting signals from the transmitting antenna Nt−1 to the receiving antenna Nr−1, and so on. Since the receiving antennas are not individually addressable by the transmitter, there are a maximum of $N_t$ data streams. The channel can be assumed to remain approximately the same (more or less unchanged in its properties) for a certain length of time called the channel coherence time.

In FIG. 1, the symbols $x_0$ to $x_{Nt-1}$ which are transmitted using the transmitting antennas $N_0$ to $N_{Nt-1}$, form a transmit vector x. Likewise, received signals $y_0$ to $y_{Nr-1}$, which are received using the receiving antennas $N_0$ to $N_{Nr-1}$, together form a received signal vector y. Without precoding (see below), the vectors y and x are related by:

$$y = Hx + n \qquad (1)$$

where H is the channel matrix and n is a term representing noise in each receiving antenna.

The channel matrix H has a "rank" which is the number of independent rows or columns, which in practical terms means the number of independent signals capable of being transmitted from the antenna ports. When some of the rows or columns are mutually-dependent (indicating correlation between the individual subchannels) the MIMO channel is called "rank deficient". In such a case, the MIMO channel is incapable of providing the maximum data throughput due to correlation.

MIMO transmission schemes include so-called non-adaptive and adaptive configurations. In the non-adaptive case, the transmitter does not have any knowledge of the channel properties and this limits performance, as the transmitter cannot take account of changes in conditions (channel profile). Adaptive schemes rely on the receiver feeding back information (channel-state information or CSI) to the transmitter, or locally deriving the CSI, allowing it to adapt the transmitted signal to changing conditions and maximize data throughput. A feedback path (not shown) from the receiver to the transmitter carries the feedback signals for informing the transmitter of the channel properties.

Closed loop systems are required in FDD (Frequency Division Duplex) systems, where the uplink (mobile to base station) and downlink (vice-versa) employ two different carrier frequencies. Because of the frequency change, the uplink and downlink channels are different and CSI needs to be fed back. In TDD (Time Division Duplex) systems—also referred to simply as TD (Time Division)—the uplink and downlink are transmitted in two adjacent time slots on the same frequency. The two time slots are within the channel coherence time (the channel does not change) so the channel state information need not be fed back. The transmitter can estimate the channel from the received signal on the reverse link, usually aided by the insertion of pilots or known waveforms by the transmitter into the signal sent on the reverse link.

The invention to be described is mainly applicable to TDD systems, and to the downlink, namely transmissions from a base station acting as the transmitter to its users acting as receivers, rather than with the uplink.

Typically, MIMO configurations involve pre-coding at the transmitter, whereby the data symbols to be transmitted are weighted using eigenvectors of each subcarrier, subchannel or subchannel group. In other words, channel-state information is used to adapt the transmit vector x to the channel conditions. This effectively allows the MIMO channel to be decomposed into a set of parallel SISO channels, so-called eigenmode signaling, so that the symbols are (given perfect channel-state information) perfectly separated at the receiver. The eigenmodes available in the channel are also called spatial modes.

Since the radio channel from eNB (evolved Node B) to UE (User Equipment) varies over time, space and frequency, the transmission from the eNB can be received with higher quality if it is 'precoded' prior to transmission. This modifies equation (1) as follows, where P is the precoder used at a particular time-frequency index:

$$y = HPx + n \quad (2)$$

In equation (2), the data streams are represented by x, which is equivalent to the minimum number of transmit and receive antenna ports. For example, in a system with 4Tx and 2Rx antenna ports, x=2. Even if x is 1 (1×1 vector), the pre-coder P can be 2×1 vector, making Px a 2×1 vector. Hence there are two transmit streams, feeding two transmit antennas, and this can be considered spatial multiplexing even in the case of a single data stream.

Precoding can be either linear, achieving reasonable results whilst limiting the complexity of processing, or non-linear, achieving near-optimal results but at the cost of greater complexity. One form of linear precoding, employed in the invention to be described, is so-called "zero-forcing" as described below.

In an ideal case, precoder P is selected such as to satisfy P=V*, where * denotes the Hermitian transpose, in the singular value decomposition (SVD) of H:

$$H = U\Sigma V \quad (3)$$

with the matrices following the usual SVD definitions.

FIG. 2 is a diagram showing the configuration of a MIMO system in more concrete terms. MIMO system 1 comprises a transmitter 2 which comprises a plurality of transmitting antennas and a receiver 3 which comprises a plurality of receiving antennas.

The transmitter 2 transmits symbols 0 to Nt−1 in parallel using Nt transmitting antennas; the symbols can be created from one data stream, referred to as vertical encoding, or different data streams, referred to as horizontal encoding. In addition, each transmitted symbol corresponds to, for example, one-bit data if the modulation method is BPSK, and corresponds to two-bit data if the modulation method is QPSK. The receiver 3 receives the signals transmitted from the transmitting device 2 using Nr receiving antennas, and it comprises a signal regeneration unit 4 which regenerates the transmitted symbols from the signals received. In this configuration, a number of spatial modes is available corresponding to the minimum value of Nt and Nr.

As indicated by the arrows in FIG. 2, the signals transmitted from each of the plurality of transmitting antennas are received by each of the plurality of receiving antennas, giving rise to Nt×Nr subchannels in total. In other words, the signals transmitted from the transmitting antenna (0) are received by receiving antennas (0) through (Nr−1), and likewise, the signals transmitted from the transmitting antennas (Nt−1) are also received by the receiving antennas (0) through (Nr−1). The characteristics of the subchannel which propagates the signals from the i-th transmitting antenna to the j-th receiving antenna are expressed as "$H_{ij}$" and form one component term of the Nt×Nr channel matrix H.

The subchannel characteristics are measured prior to transmission of actual data, typically by sending pilot (or reference) signals. The transmitter 2 first transmits a pilot signal using the transmitting antenna (0). The receiver 3 receives the pilot signal transmitted from the transmitting antenna (0) through the receiving antennas (0) to (Nr−1). In this case, since the transmitting power of the pilot signal is determined in advance, the receiving device 3 obtains each component ($H_{0,0}$ to $H_{0,Nr-1}$) of the first row in the channel matrix by monitoring the power, SNR, etc. of the signal received through the receiving antennas (0) to (Nr−1). Thereafter, each component of the 2nd to Nt-th rows in the channel matrix can be obtained, in the same way using pilot signals transmitted from each transmitting antenna.

In the MIMO system 1, if the symbol x ($x_0$~$x_{Nt-1}$) is transmitted from the transmitting device 2, the signal y ($y_0$~$y_{Nr-1}$) detected in the receiving device 3 is expressed by equation (2). Therefore, in the absence of noise n, the receiving device 3 can obtain correct transmitted symbols by detecting the channel matrix H and performing an inverse operation corresponding to the influence of each component in the channel matrix H on the signal. In practice, however, noise n is present and in addition, the channel matrix H cannot be determined with absolute accuracy. Therefore, the receiver 3 estimates the transmitted symbol from the received signal y and the channel matrix H and introduces an algorithm for minimizing the error of this estimated value.

By way of background explanation, a MIMO-OFDM transmitter and receiver will be briefly outlined with reference to FIGS. 3 and 4. FIG. 3 is a schematic diagram of a MIMO-OFDM transmitter. High-speed binary data is encoded (convolutional code is an example), interleaved, and modulated (using a modulation scheme such as BPSK, QPSK, 64QAM, and the like). Independent channel encoders may be used for each transmitting antenna. Subsequently, the data is converted into parallel low-speed modulated data streams which are fed to N sub-carriers. The output from each encoder is carried separately on a plurality of sub-carriers. The modulated signals are individually precoded and then frequency-division multiplexed by N-point inverse fast Fourier transform (IFFT) The resulting OFDM signal is converted into an analog signal by a D/A converter, is upconverted into the RF band, and transmitted over the air.

At the MIMO-OFDM receiver schematically shown in FIG. 4, the received signals from the Nr receive antennas are filtered by a band pass filter (BPF), not shown, and then down-converted to a lower frequency. The down-converted signal from each antenna is sampled by an A/D converter, not shown, to convert it into a digital signal, and the guard interval is removed as denoted by "-GI" in the Figure. Then, the sampled data is fed to the N-point fast Fourier transformer (FFT). After Fourier transformation is performed on each of the signals received through the Nr receive antennas, they are fed to the MIMO signal processing unit 11. Here, the MIMO signal processing unit 11 comprises a signal regeneration unit 4 which performs algorithms to compensate for the channel characteristics, using the channel matrix H and taking account of the precoding applied on the transmitter side. In this example, the output of the MIMO signal processing unit 11 is Nt independent data streams, and each data stream is independently demodulated, de-interleaved, and decoded. However, the outputs may be demultiplexed to form a single data stream, if a single stream was multiplexed, i.e. vertical encoding was applied, at the transmitter on to multiple antennas.

The above explanation has considered the case of a single transmitter sending MIMO signals to a single receiver, but of course a practical MIMO wireless communication system is much more elaborate than this, providing many mutually-adjacent cells in each of which a base station transmits over respective MIMO channels to multiple subscriber stations simultaneously. In practice, the adjacent cells overlap to some extent such that transmissions from one base station in one cell can cause interference to users at the edges of adjacent cells. If the cells have a hexagonal grid arrangement, then one cell may be adjacent to up to six neighboring cells such that transmissions to a particular user may cause interference in more than one other cell.

MIMO and OFDMA are expected to enable high-capacity data throughput in future wireless communication systems such as those compliant with LTE-Advanced (below, LTE-A), or IEEE802.16m (also called Advanced WiMAX (Worldwide Interoperability for Microwave Access) or Gigabit WiMAX). However, the above multi-user interference effects can become a significant obstacle in achieving the expected capacity enhancements in such systems. For example, a user near the edge of one cell, communicating with one BS using a particular frequency/time resource, may interfere with a user in an adjacent cell, served by a different BS using the same frequency/time resource.

Consequently, in OFDMA based LTE wireless cellular systems, intercell interference, particularly at the cell edges, can be a significant obstacle in providing a high quality of service. Known techniques to mitigate inter-cell interference include Inter-Cell Interference Coordination (ICIC), and enhanced Inter-Cell Interference Coordination (eICIC). Briefly, these schemes work on avoiding the same time frequency resources being used in adjacent cells by eNB coordination, and distinguish between resources which could be used at cell centre and resources which could be used at cell edge.

However when the cells become fully loaded (because LTE supports a frequency reuse of 1, to enable higher throughputs), it becomes very difficult to avoid interference in the above manner. This problem is aggravated if the signals from supposedly cell centre regions spill over to the cell edges. Such situations can occur for example in street canyons in outdoor networks and in corridors in indoor networks. In such cases some form of interference cancellation is required to provide a good enough service to the cell edge user. There is consequently a need to implement a MIMO pre-coding scheme, which can improve the quality of service to the cell edge users. A scenario of particular relevance is where the loading of the two cells is such that schedulers cannot allocate resource blocks to UEs which result in sufficiently low interference to allow acceptable performance, implying that the existing time and frequency domain techniques may not be good enough on their own.

A MIMO pre-coding based interference cancellation scheme applicable in Rel.8, 9 of the LTE-FDD standards was proposed in the applicant's co-pending European Patent Application No. 12187490.3, based on codebook based PMI feedback. However, in a codebook based PMI method, the choices of precoding vector P are finite and hence it will be only an approximate fit to the channel H.

The following LTE standards documents provide background information and are hereby incorporated by reference:
3GPP TS36.213, v.10.5.0
3GPP TS36.211, v.10.4.0.

SUMMARY

According to a first aspect of the present invention, there is provided a time-division duplex, TDD, wireless communication method in which a first base station uses multiple antenna ports in MIMO communication with terminals in a first cell, the MIMO communications to the terminals being performed with application of a respective precoder, the method comprising, in the first base station:
  determining information about a MIMO channel between the first base station and a first one of the terminals;
  transmitting data to the first terminal via the channel;
  detecting that the first terminal is subject to interference from a second cell;
  storing the information about the channel and handing over the first terminal to the second cell;
  obtaining information on a resource allocation to the first terminal in the second cell;
  finding an interference-reducing precoder on the basis of the stored information about the channel;
  selecting a second terminal in the first cell with which to precode communications by the interference-reducing precoder; and
  performing wireless communications with the second terminal with application of the interference-reducing precoder and using a resource allocation in the first cell which includes said resource allocation to the first terminal in the second cell.

Here, the term "antenna port" need not refer to a distinct, physical antenna, although it may do so. In LTE for example, antennas of a base station are capable of being configured to provide a plurality of antenna ports which do not correspond one-to-one with physical antennas. It is, however, necessary that the transmit signals from the antenna ports be distinguishable; for example, the same physical antenna may be employed with different polarizations (horizontal or vertical).

In the above method, preferably, determining information about the MIMO channel comprises measuring a reference signal transmitted from the first terminal to the first base station. In the case of an LTE implementation for example a suitable reference signal is the sounding reference signal, SRS.

The method may further comprise the first base station transmitting a reference signal to each terminal with application of the respective precoder for informing the first terminal of the precoder. Again in the case of LTE, a UE-specific RS can be used for this purpose.

Preferably, the detecting that the first terminal is subject to interference comprises the first terminal reporting to the first base station that a measurement of signal quality falls below a predetermined threshold.

Normally the first and second cells will be provided by different base stations. In this scenario the references to "first cell" and "second cell" above are equivalent to "first base station" and "second base station" respectively. In this case the obtaining of the resource allocation comprises the first base station receiving an indication of the resource allocation from the second base station.

An alternative scenario is one in which both cells are provided by the same base station. In this case, the obtaining of the resource allocation is a simple matter of retrieving it from the base station's scheduler.

In another form of the method, the resource allocation to the terminal in the second cell is a predetermined resource allocation, in other words this resource allocation can be predefined either in the system specification or by some earlier configuration of the base station. In this case the obtaining simply comprises retrieving stored information of the predetermined resource allocation.

A first embodiment of the above method can be summarized as follows:

the determining information about the MIMO channel comprises deriving a channel matrix of the channel;

the transmitting comprises performing singular-value decomposition on the derived channel matrix to obtain a signal space matrix and a null space singular matrix and using the signal space matrix as the precoder;

the storing and finding comprise storing the null space singular matrix and using it as the interference-reducing precoder; and the selecting comprises selecting, as the second said terminal, a terminal among all terminals in the first cell having the highest achievable capacity of communication from the first base station using the interference-reducing precoder.

A second embodiment of the method can be used in the case that the first base station is unable to perform singular-value decomposition of matrices, and can be summarized as follows:

the determining information about the MIMO channel comprises receiving, from the first said terminal, a sounding reference signal, and an indication of a preferred precoder among a set of precoders in a codebook;

the transmitting comprises using the preferred precoder, indicated by the first said terminal, as the precoder;

the storing comprises storing the channel determined from measuring the sounding reference signal; and the finding comprises selecting, as the interference-reducing precoder, a precoder among a set of precoders in a codebook for which an interference value with the determined channel is a minimum.

The second embodiment may further comprise the first said terminal (UEB) searching the codebook for a precoder allowing the highest achievable capacity (CA) of communication from the first base station (eNBA).

Methods of the invention may be applied to an LTE-based wireless communication system, in which case the first base station preferably employs LTE Transmission Mode 9 for its wireless communications to the terminals. As already mentioned this allows precoding to be closely matched to the channel conditions, without being restricted to a codebook.

In any case, preferably, the first base station disposes of a number of antenna ports greater than a number of antenna ports of each terminal. This allows a null space to be inherently present in the MIMO channel on the downlink.

According to a second aspect of the present invention, there is provided a wireless communication system comprising:

one or more base stations forming first and second cells; and a plurality of terminals served by the cells;

the one or more base stations arranged to allocate resources to, and wirelessly communicate with, terminals served by the first and second cells, and to perform wireless communications with the terminals by precoding in accordance with a precoder, wherein a first base station of the one or more base stations comprises a control unit arranged to:

determine information about a MIMO channel between the first base station and a first terminal;

transmit data to the first terminal via the channel;

detect that the first terminal is subject to interference from a second cell;

store the information about the channel and handing over the first terminal to the second cell;

obtain information on a resource allocation to the first terminal in the second cell;

find an interference-reducing precoder on the basis of the stored information about the channel;

select a second said terminal in the first cell with which to precode communications by the interference-reducing precoder; and perform wireless communications with the second terminal with application of the interference-reducing precoder and using a resource allocation in the first cell which includes said resource allocation to the first terminal in the second cell.

In one form of the above wireless communication system, a second base station provides the second cell, and the first base station is arranged to obtain from the second base station said information on a resource allocation to the first terminal in the second cell.

According to a third aspect of the present invention, there is provided a base station in a wireless communication system in which a plurality of terminals are served by first and second cells, the base station providing at least said first cell and arranged to allocate resources to terminals and to perform wireless communications with terminals by precoding in accordance with a precoder, the base station having a processor arranged to:

determine information about a MIMO channel between the first base station and a first terminal;

transmit data to the first terminal via the channel;

detect that the first terminal is subject to interference from a second cell;

store the information about the channel and hand over the first terminal to the second cell;

obtain information on a resource allocation to the first terminal in the second cell;

find an interference-reducing precoder on the basis of the stored information about the channel;

select a second terminal in the first cell with which to precode communications by the interference-reducing precoder; and perform wireless communications with the second terminal with application of the interference-reducing precoder and using a resource allocation in the first cell which includes said resource allocation to the first terminal in the second cell.

According to a fourth aspect of the present invention, there is provided a program which, when executed by a processor of a base station, performs any method as defined above.

The program may be stored on one or more non-transitive computer-readable recording media.

In systems known to the art, high levels of inter-cell interference may be experienced by UEs to an extent that existing methods such as FFR and (e)ICIC cannot reduce interference to suitably-low levels. In the case of a network operating a multiple-input multiple-output (MIMO) transmission mode, modifying the transmission profile of an interfering eNodeB by spatial precoding could be used to provide another domain in which interference can be reduced. Embodiments of the present invention provide means for selecting precoders and users jointly in two cells such that interference is reduced further than would be possible by the application of existing techniques alone.

Embodiments of the present invention are aimed specifically at TD-LTE (LTE-TDD) systems which use TDD (Time Division Duplex) to partition uplink and downlink transmissions, and may provide a new pre-coder selection scheme to be used in MIMO pre-coding for interference cancellation. The uplink/downlink channel reciprocity in TDD systems and the new transmission mode TM9 in LTE Release 10 are exploited to enhance the pre-coder selection and in-cell user selection criteria.

This can provide significantly better interference cancellation than in the LTE-FDD case, so that the potential loss of throughput for the in-cell user can be more effectively compensated to arrive at net throughput gains.

BRIEF DESCRIPTION OF THE DRAWINGS

Reference is made, by way of example only, to the accompanying drawings in which.

DETAILED DESCRIPTION

Figure 1:
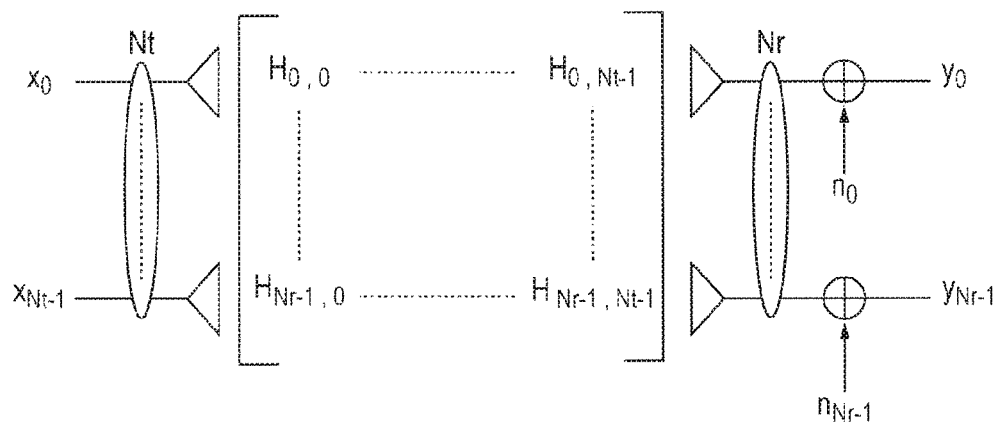
FIG. 1 is a conceptual diagram of a MIMO communication channel according to the related art.
Figure 2:
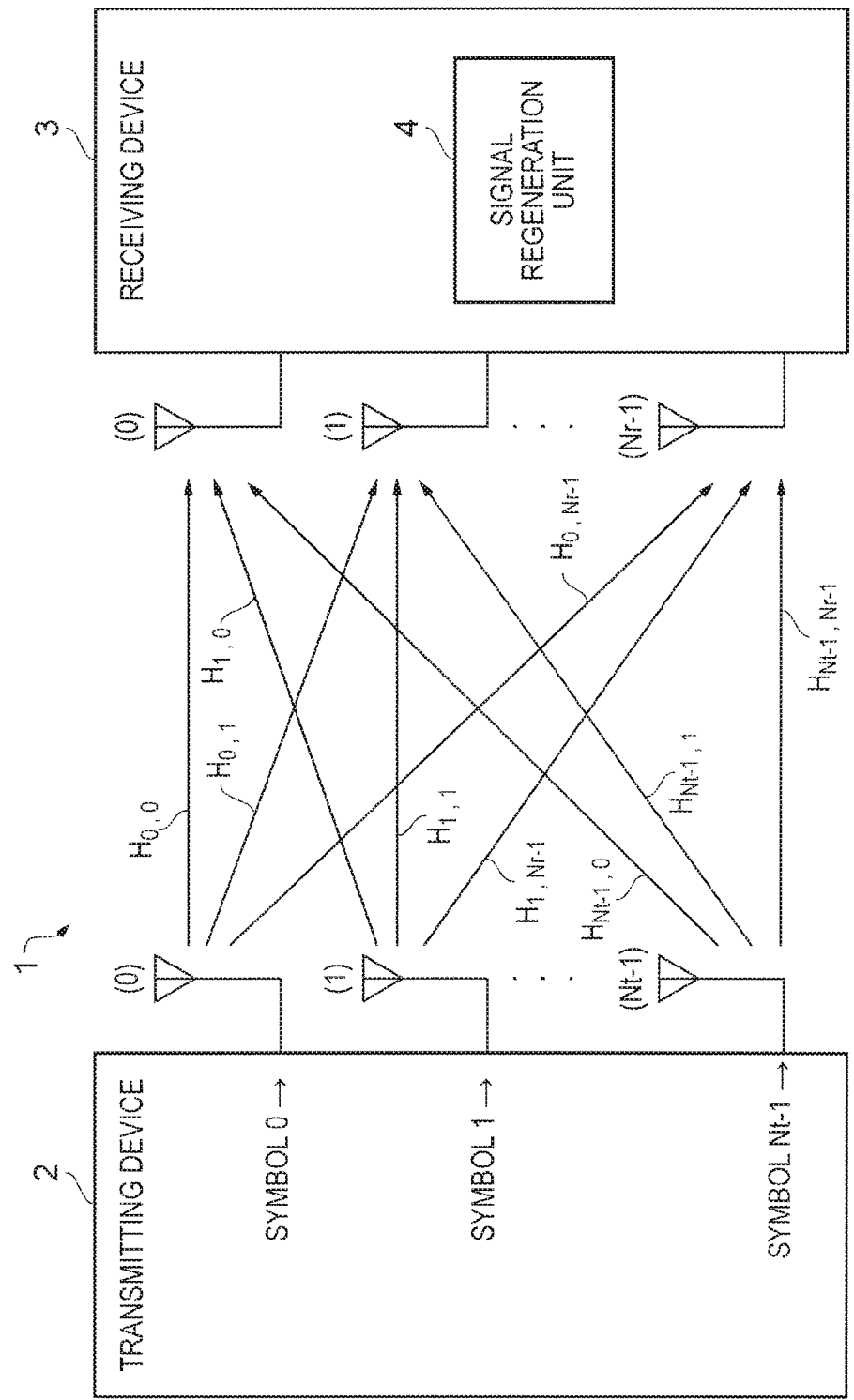
FIG. 2 is a schematic diagram of a transmitter and a receiver communicating via a MIMO channel according to the related art.
Figure 3:
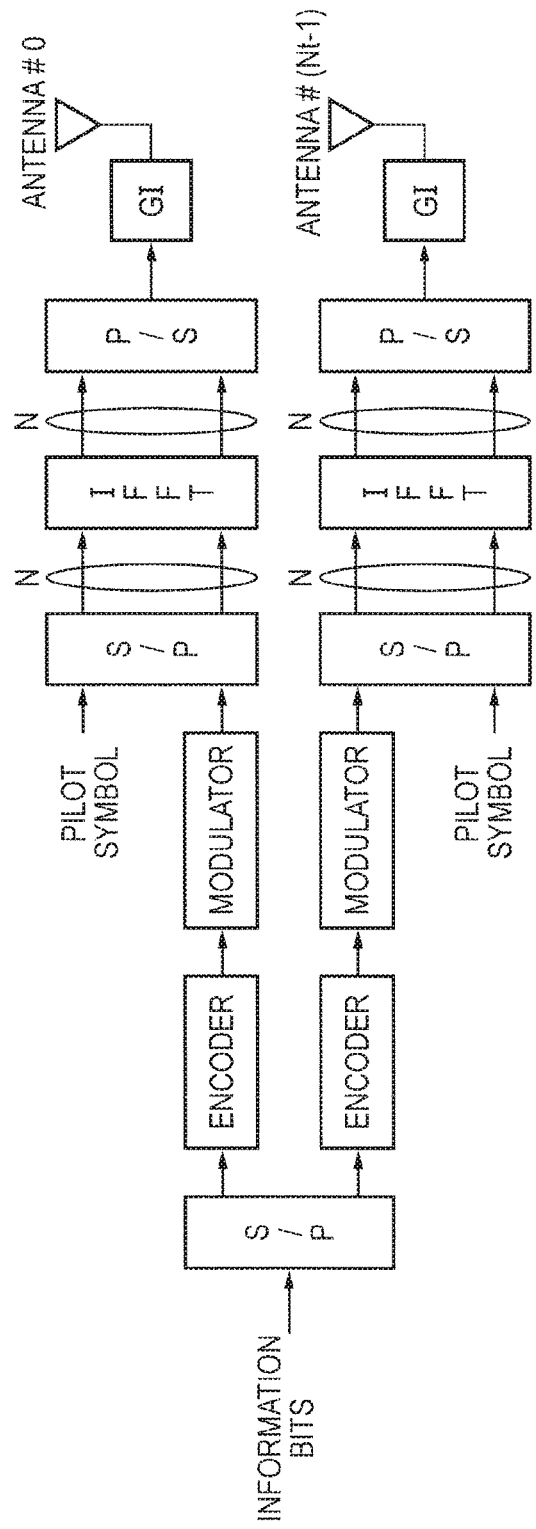
FIG. 3 is a schematic diagram of a MIMO-OFDM transmitter according to the related art.
Figure 4:
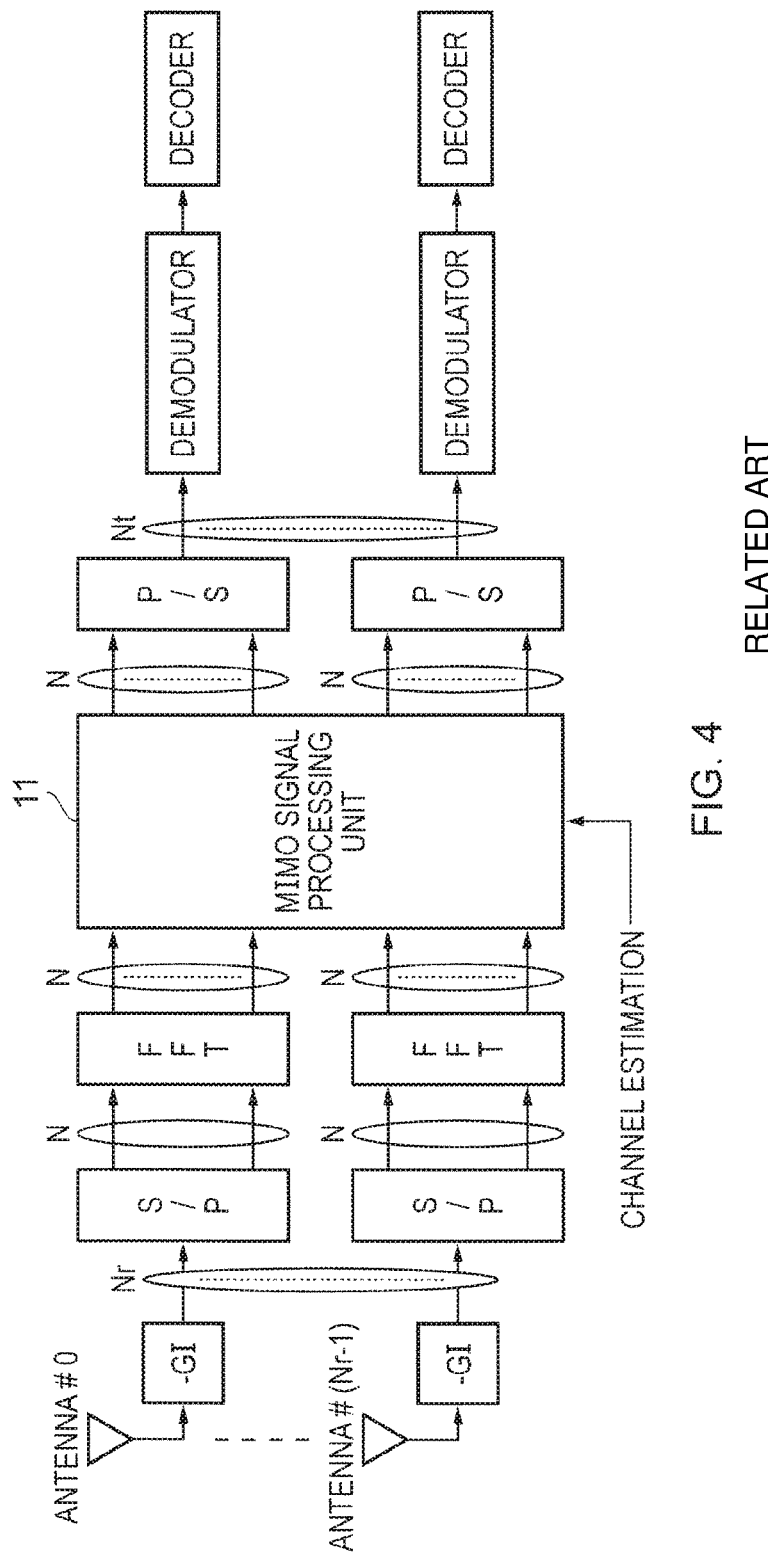
FIG. 4 is a schematic diagram of a MIMO-OFDM receiver according to the related art.

Before explaining an embodiment of the present invention with respect to FIGS. 5 to 7, an issue with interference mitigation in LTE will be explained, along with "Transmission Modes" (TMs) in LTE, since the described embodiment is based on LTE by way of example.

LTE and LTE-A are a group of standards comprising a number of "Releases" such as Rel-8, Rel-9 etc., later Releases offering increased sophistication and placing greater demands on UE capabilities.

In order to support a variety of different operating scenarios, user needs and network needs in LTE, the specifications define a set of transmission modes (TMs). In Rel-8, there are TMs 1-7, and TM 8 is added in Rel-9. The following Table lists the TMs in Rel-9.

| Transmission modes | Description | Comment |
| --- | --- | --- |
| 1 | Single transmit antenna | single antenna port; port 0 |
| 2 | Transmit diversity | 2 or 4 antennas |
| 3 | Open loop spatial multiplexing with cyclic delay diversity (CDD) | 2 or 4 antennas |
| 4 | Closed loop spatial multiplexing | 2 or 4 antennas |
| 5 | Multi-user MIMO | 2 or 4 antennas |
| 6 | Closed loop spatial multiplexing using a single transmission layer | 1 layer (rank 1), 2 or 4 antennas |
| 7 | Beamforming | single antenna port, port 5 (virtual antenna port, actual antenna configuration depends on implementation) |
| 8 | Dual-layer beamforming | dual-layer transmission, antenna ports 7 and 8 |

A new Transmission Mode TM9 is added in Rel-10. This is a multi-layer transmission mode to support closed-loop SU (Single User)-MIMO up to rank 8, as described in the above mentioned 3GPP TS36.213, v.10.5.0. TM9 combines the features of SU- and MU-MIMO without the need to reconfigure UEs when switching between SU and MU communication. That is, in TM9 the eNB can seamlessly switch between 4 UEs with a single layer and two UEs each with up to two layers, and can use any precoder. The precoder is indicated to the UE by using it to precode a UE-specific RS.

As already mentioned, in equation (3) above, P is ideally selected such as to satisfy P=V*, where the * denotes the Hermitian transpose. A MIMO pre-coding based interference cancellation scheme applicable in Rel.8, 9 of the LTE-FDD standards was proposed in the applicant's co-pending European Patent Application No. 12187490.3, based on codebook based PMI feedback. However in the codebook based PMI method, the choices of P are finite and hence it will be only an approximate fit to the channel H.

If channel knowledge is available at both the transmitter and the receiver and the pre-coding vector can be indicated to the receiver through other means, it is possible to move away from the pre-coder codebook and obtain a better match to the interference channel. The Release 10 LTE-TDD systems offer these possibilities.

In particular, Rel 10 introduces TM9 as already mentioned, which can be used for transmissions using UE specific Reference Signals (RS). This enables non-codebook based beamforming solutions, where the selected precoder P can be matched more closely to V*. Together with the channel reciprocity properties of LTE-TDD systems, embodiments of the present invention provide a method to use this TM9 to further improve the interference cancelling scheme proposed in European Patent Application No. 12187490.3.

On the other hand, in Rel 10 of LTE, a UE can only decode PDSCH transmissions from one cell, or one eNB at a time. In order to decode transmissions from another cell, it must be handed over by the network from the source cell into the destination cell. In doing so, the specifications have no requirement for the UE to retain any information relating to precoding in the source cell. This makes it difficult for the network to determine scheduling and precoding in two cells jointly which will help mitigate interference for a cell-edge UE. Thus, methods for providing inter-cell interference mitigation by joint scheduling and precoding whilst not requiring new information from UEs are of significant interest.

The proposed invention provides a method for a MIMO precoding scheme to provide interference reduction (or equivalently SINR improvement) to a cell edge user. MIMO precoding for interference cancellation by zero forcing is a well known technique. This invention provides a novel methodology to implement a precoder and suitable in-cell user selections in an LTE based system for MIMO precoding, for asymmetric MIMO systems. In this context, "asymmetric" means that the number of antenna ports in use for relevant receptions at the UE (the receive side), $n_R$, is less than the number of antenna ports in use for relevant transmissions at the eNB (transmit side), $n_T$, as is usually the case. This does not constrain the number of physical antennas or antenna ports either the UE or the eNB may actually possess or have the ability to use. To identify suitable users from among a set where the number of physical antennas or antenna ports at the UE and eNB may be any numbers, methods such as those disclosed in European Patent Application 08166035.9 may be used.

In general, unless otherwise indicated, the embodiments described below are based on LTE, where the network operates using TDD (henceforth denoted TD-LTE) and comprises one or more eNodeBs, each controlling one or more downlink cells, each downlink cell having a corresponding uplink cell. Each DL cell may serve one or more terminals (UEs) which may receive and decode signals transmitted in that serving cell.

The schematic diagram for the proposed scheme is shown below in FIG. 5. This shows two adjacent cells Cell A and Cell B, provided by respective base stations $eNB_A$ and $eNB_B$. The user $UE_B$ was originally served by $eNB_A$ in Cell A and communicating on channel $H_{AB}$, but is shown communicating via channel $H_{BB}$ with $eNB_B$, following handover to Cell B. In this state, $H_{AB}$ becomes an interference channel for $UE_B$. Meanwhile another user $UE_A$ continues to be served by $eNB_A$.

The basic idea of the precoding scheme is to cancel the interference the cell edge user $UE_B$ receives from the neighbor $eNB_A$, via the channel $H_{AB}$. Mathematically the precoder $V_0$ should be in the null space of $H_{AB}$, so that the product of $H_{AB}V_0$ becomes closer to 0, which achieves the above mentioned zero forcing. Because we are dealing with asymmetrical MIMO schemes, the null space is inherently present in the MIMO channel and there is no need to sacrifice spatial modes to achieve the nullspace. The present invention includes methodologies to select the interference-cancelling codeword $V_0$ to suit channel $H_{AB}$ and to select a suitable user in cell A to assign the same resources as for user $UE_B$ (in cell B) and then to pre-code with $V_0$.

Let the selected user in cell A be termed as $UE_A$. As $UE_A$ has to be assigned the same resources as for $UE_B$ and precoded with $V_0$, it can suffer some loss in throughput as the choice of $V_0$ may not be its preferred codeword to maximize throughput.

The received signal equations for $UE_A$ and $UE_B$, assuming they are scheduled in the same downlink resources by the eNBs, can be stated as follows:

$$y_A = H_{AA}V_0 x_A + H_{BA}V_B x_B + n_1 \quad (1)$$

$$y_B = H_{BB}V_B x_B + H_{AB}V_0 x_A + n_2 \quad (2)$$

The first term in both equations relate to signal power, the second term to interference from the neighbor cell and the third term to noise. The aim of the algorithm is to improve the signal quality of $y_B$ (by cancelling the interference), while ensuring that the signal quality of $y_A$ is not excessively degraded. As noted before, $V_0$ may not be the preferred precoder for $UE_A$, while $V_B$ is the preferred precoder for $UE_B$.

Figure 6:
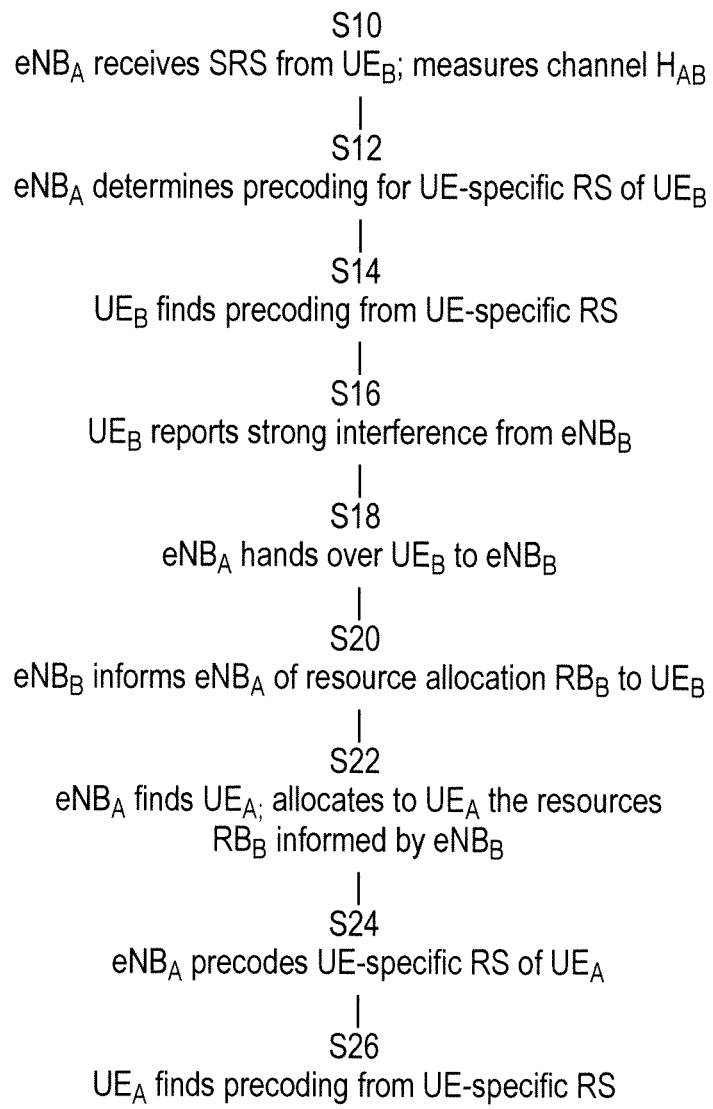
FIG. 6 is flowchart of process steps performed at a base station eNB$_A$ in an embodiment of the present invention.
Figure 7:
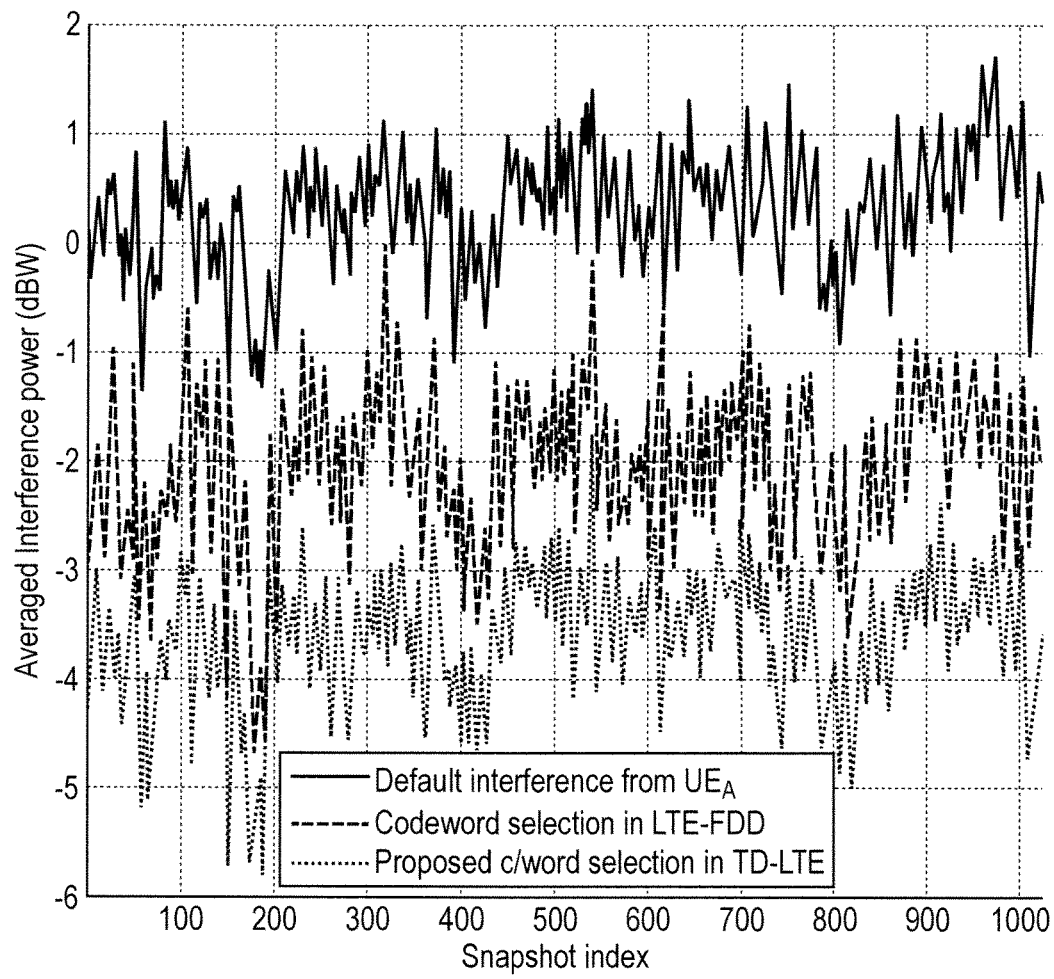
FIG. 7 shows results of simulation of an embodiment of the present invention.

An outline of the method is shown in the flowchart of FIG. 6, mainly focused on the first embodiment to be described, but also applicable with minor modification to the second embodiment.

It is assumed that $UE_B$ is initially connected to $eNB_A$. During the process, a handover (HO) will be carried out for $UE_B$, from $eNB_A$ to $eNB_B$. (The situation shown in FIG. 5 is after the HO). We further assume there is at least a second UE, $UE_A$, also served by $eNB_A$, and that it is possible for the two eNBs to agree to schedule certain users in the same resources in their respective cells.

In Rel. 10 TD-LTE systems, UE specific Reference Signals (RS) can be employed in the downlink and Sounding RS (SRS) in the uplink to identify the radio channels and the precoding vectors. The uplink SRS allows the $eNB_A$ to identify the channel $H_{AB}$ (on the uplink, before the HO). Because of the channel reciprocity in TD-LTE (in TD-LTE the uplink and downlink transmission slots are packed closer than the channel coherence time), $eNB_A$ can apply this channel knowledge as valid for the downlink as well.

The steps to be described are performed mainly by a processor (control unit) of the base station $eNB_A$.

Thus, firstly, in step S10, to obtain channel knowledge on $H_{AB}$, $eNB_A$ receives a sounding reference signal SRS from $UE_B$. Then (step S12) $eNB_A$ finds the pre-coding vectors through SVD decomposition of channel $H_{AB}$ and uses them on the UE specific RS on the downlink in the specified TM9, before the handover. In step S14, the intended $UE_B$ can estimate the pre-coding vectors using these UE specific RS because it already has knowledge on channel $H_{AB}$.

The operation of the pre-coding scheme under the above steps is detailed in the first embodiment below. In certain eNBs (especially the lower cost Femto eNBs etc), the cost and complexity of carry out SVD to identify the exact pre-coding matrices will be too high. For such cases we propose a codebook based alternate variation in the second embodiment.

Next, in step S16, $UE_B$ receives interference from downlink transmissions from $eNB_B$. It reports this fact to $eNB_A$ in some way, for example by reporting a low value of RSRQ (Reference Signal Reception Quality).

For simplicity it is further assumed that one precoder and one UE-specific RS applies to the whole data transmission from the eNB to each UE. In practice, this depends on the number of resource blocks (RBs) allocated to $UE_B$ by a scheduler in the eNB, based on the data rate needed. If more than one RB is used, each one will have its own UE-specific RS and thus the channel and the relevant pre-coders can be calculated.

In response to the report from $UE_B$, $eNB_A$ hands over $UE_B$ to $eNB_B$ in step S18. While $UE_B$ is connected to $eNB_A$, strong interference comes from $eNB_B$. On the other hand, after $UE_A$ has been handed over to $eNB_B$ and $H_{AB}$ becomes the interference channel. The interference is there because both cells are loaded and resources are in collision. It should be noted that here, the handover is a procedure to obtain channel knowledge, not in itself a measure to control interference.

Then (S20), $eNB_B$ notifies $eNB_A$ of one or more resource blocks it has allocated to $UE_B$ for its downlink data, following the handover. This resource allocation is indicated in FIG. 5 by $RB_B$.

The next step (S22) is for $eNB_A$ to choose another user $UE_A$, connected to $eNB_A$ and capable of being assigned (at least) the same resource allocation $RB_B$ as was notified from $eNB_B$. Normally, the resource allocation to $UE_A$ will be the same as the resource allocation to $UE_B$; that is, $RB_B$ and no other resource block(s). However, it would also be possible for $UE_A$ to receive some additional resource allocation as well.

This step also involves $eNB_A$ determining a suitable precoding for this transmission, namely the above mentioned interference-cancelling codeword $V_0$.

As part of its downlink transmission to the chosen user $UE_A$, $eNB_A$ inserts UE-specific RS which it precodes with the precoding $V_0$ so determined. This serves, in step S26, to inform $UE_A$ of the precoding being used by $eNB_A$, so that the latter can correctly decode the data transmission. This ends the process until the next time the process has to be repeated, for example due to another user experiencing strong interference from $eNB_B$.

The complete operational steps are included in the two embodiments below, although some of the steps may overlap. Both embodiments make use of the channel knowledge made available through the TD-LTE system. The difference lies in the manner they acquire the pre-coding matrices.

First Embodiment—Interference Mitigation Precoder $V_0$ Selection Based on SVD (a) The default state for the network is as shown in FIG. 1, but with $UE_B$ connected to $eNB_A$ and $eNB_B$ causing strong interference (in other words, prior to handover of $UE_B$). By use of reference signals in TM9 of Rel.10 TD-LTE, $eNB_A$ has obtained channel knowledge on $H_{AB}$, and $eNB_A$ stores this knowledge. While $UE_B$ is connected to $eNB_A$ (before Handover), $eNB_A$ can detect the SRS from $UE_B$ to estimate the uplink channel. Since in TDD, the uplink and downlink channels can be assumed to be similar, this estimate is valid for the downlink channel $H_{AB}$.

The channel $H_{AB}$ is subjected to Singular Value Decomposition (SVD) at $eNB_A$ to produce the following matrices of U, D and V, where U denotes the left singular matrix and D the diagonal, singular value matrix. As the channel $H_{AB}$ is asymmetric, the right singular matrix contains signal space matrix $V_s$ and null space matrix $V_0$.

$$H_{AB} = U \cdot D \cdot V$$

$$V = [V_s V_0] \quad (3)$$

Under normal operation, $eNB_A$ precodes the data to $UE_B$ with $V_s^*$ and $UE_B$ is able to decode the data as it has knowledge of the precoder $V_s$. By contrast, zero forcing becomes possible by precoding with the null space matrix $V_0$.

When the interference from $eNB_B$ becomes strong, the RSRQ (or RSRP) values reported by $UE_B$ (to $eNB_A$) start to drop. This provides the preferred trigger for performing a method of the invention. The RSRQ (or RSRP) values may be communicated to the eNB either in response to a periodic report requested by the eNB, or by a report sent by the UE on its own initiative in response to experiencing poor signal quality. When the RSRQ values falls below a pre-defined threshold, $eNB_A$ records the null space singular matrix $V_0$ and initiates a HO of $UE_B$ to $eNB_B$.

(b) Now $UE_B$ is connected to $eNB_B$ and receives strong interference from $eNB_A$. $eNB_B$ communicates with $eNB_A$ and indicate the resource blocks (RBs) used for $UE_B$. As both cells are heavily loaded, $eNB_A$ does not have the option to avoid using these RBs amongst its users. With the use of user specific RS and reciprocity of TD-LTE, $eNB_A$ is aware of the channels and optimal precoder matrices for each of its active users. It is also aware of the stored null space vector $V_0$ for $UE_B$ (before the HO). The challenge for user selection is for $eNB_A$ to find a user $UE_A$ amongst its active users to which to allocate the resource block(s) $RB_B$ used by $UE_B$, and then to pre-code the transmission to this user $UE_A$ with $V_0$. It should be noted that the aim now is to achieve zero forcing, hence $V_0$ and not $V_0^*$ is used for the precoding.

For this, the first embodiment uses the achievable limit on MIMO capacity $(C_A)$ as a metric. The user with the highest $C_A$ can be chosen as $UE_A$ and the definition of $C_A$ is as follows.

$$C_A = \log_2 \left\{ \det \left( I_n + \frac{\rho}{n_T} (H_{AA} V_0 \cdot (H_{AA} V_0)^H) \right) \right\} \quad (4)$$

The terms $I_n$ indicate an identity matrix, $\rho$ the SINR experienced by the user, and $n_T$ the number of transmit antennas. $eNB_A$ can iteratively check this metric for each of the active users with knowledge of their channels $H_{AA}$. Highest $C_A$ indicates a good alignment of $V_0$ with the preferred precoder for this channel and also good SINR (Signal To Interference Plus Noise Ratio), both of which are desirable features.

The other users' channel knowledge (generally termed as $H_{AA}$) are updated as and when required, depending on the rate of change. For this purpose, $eNB_A$ requests each UE to send the SRS periodically for these channels. In this way, at the point of deciding to apply $V_0$ for any one of these users $(UE_A)$, it can be assumed that the channel knowledge is up-to-date and it is possible to evaluate the capacity as per equation (4).

(c) Once the desired user is found amongst the active users in cell A, $eNB_A$ allocates to this user the same one or more resource blocks $RB_B$ reported by $UE_B$ in step 2, and precodes the transmission to this user with $V_0$. Before precoding the actual data, reference symbols are pre-coded as UE specific RS in the downlink, so $UE_A$ can obtain knowledge of the pre-coder $V_0$.

The UE-specific RS occur at pre-defined points (or resource elements) of a sub-frame, forming a mesh pattern covering the sub-frame evenly. The data points are fitted in-between these RS points. The UE can store the entire sub-frame contents, work out what the pre-coders are by examining the RS and then work out the data bits.

Having performed the above process, operation may continue with $eNB_A$ transmitting data to $UE_A$ using the same $RB_B$ as those used by $UE_B$, for a certain length of time such as 100-200 ms, corresponding to the channel coherence time in indoor networks, or until circumstances change, for example if another user in cell A experiences high interference, or when $eNB_B$ notifies $eNB_A$ that the resource allocation in cell B has changed.

TM 9 of LTE (Rel. 10) is used throughout in the above example.

Second Embodiment—Interference Mitigation Precoder $V_0$ Selection Based on Codebooks The embodiment is useful for lower complexity eNBs such as Femto eNBs, which cannot be tasked with carrying out SVD. The Rel.10 TD-LTE system will use TM9 user specific signaling and channel reciprocity to obtain channel knowledge at both eNB and UE ends. However the system reverts back to codebook based transmission mode 4 (TM4) for actual pre-coded data transmissions.

(a) Again the default state for the network is with $UE_B$ connected to $eNB_A$ and experiencing strong interference from $eNB_B$. The channel knowledge is available at both ends; however, the system has reverted to codebook based PMI mode (TM4) and uses these PMI pre-coders. $UE_A$ has indicated the best pre-coder $V_s$ (from the codebook) to $eNB_A$ and this is used in pre-coding. Amongst the methods for choosing the pre-coder $V_s$, the UE can look for maximizing capacity as depicted in eqn (4), iteratively checked for all pre-coders $V_n$ in the codebook. When the RSRQ falls below a threshold, $eNB_A$ initiates a HO of $UE_B$ to $eNB_B$, as before.

(b) When $UE_B$ connects to $eNB_B$ (as in FIG. 1) the strong interference comes from $eNB_A$. $eNB_B$ now communicates with $eNB_A$, to indicate the $RB_B$ used for data transfer to $UE_B$. However, $eNB_A$ only has the knowledge about the best pre-coder used for $UE_B$ (in step 1) $V_s$ and the stored channel knowledge of $H_{AB}$. In order to find the least interfering pre-coder on channel $H_{AB}$, $eNB_A$ iteratively checks all the pre-coder entries $V_n$ in the code-book for the following interference value $I_c$:—

$$I_C = \sqrt{\sum_{i,j}(\text{abs}(H_{AB} * V_n))^2} \quad (5)$$

This is basically a magnitude sum of the (i,j) elements in the resulting interference matrix. $eNB_A$ chooses the vector with the least value of $I_c$ as $V_0$. This method of $V_0$ calculation with the aid of channel knowledge is more effective than calculating with only the knowledge of $V_s$ as proposed in European Patent Application No. 12187490.3. Simulation results to this effect are shown in FIG. 6.

The simulation employs measured MIMO channels and looks at the interference caused on $UE_B$ (via channel $H_{AB}$) by $UE_A$. The x-axis represents time, the 1000 snapshots corresponding to 6 seconds in total. The y-axis represents the amount of interference. The upper curve is the default interference, when $UE_A$ uses the best pre-coder for its own channel $H_{AA}$ (the selection of $UE_A$ is detailed in the next step). The middle curve is obtained when the orthogonal pre-coder to the pre-recorded vector $V_s$ is used on $UE_A$. This calculation is detailed in European Patent Application No. 12187490.3 and this reduces the average interference by around 2 dB. The lower curve represents the interference from using the minimum interference codeword $V_0$, with the knowledge of $H_{AB}$ at the transmitter. This is the codeword selection for TD-LTE in the second embodiment and it reduces the average interference further by around 1.5 dB.

(c) Once the minimum interference pre-coder is chosen as in step (b) above, $eNB_A$ has to find the active user $UE_A$ to be pre-coded with $V_0$. Again TD-LTE enables the transmitter $eNB_A$ to obtain channel knowledge of all the active user channels. Then $eNB_A$ selects the active user $UE_A$, which maximizes the information theoretical capacity as per eqn (4). Here, the $V_0$ is not the precise singular vector, but a codebook entry, which will closely approximate this vector. Then $eNB_A$ will inform the chosen $UE_A$ about the pre-coder to be used as a codebook index.

In a possible variant of this step, the method of the invention is applied selectively, taking into account capacity constraints in cell A. If the channel capacities of all the active users $UE_A$ in $eNB_A$ do not meet a pre-defined threshold, $eNB_A$ can decide not to pre-code any user with $V_0$, but to use the optimal pre-coder for individual users. This will ensure that the data rate for the chosen in-cell user does not drop down a pre-defined value, in assisting the cell edge user to improve his data rate.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality described above.

Such a microprocessor or DSP may be present in a base station of a wireless communication system. In a wireless communication system employing relay stations, it will be further preferable for each relay station to include functionality for performing the method according to the present invention. A processor or DSP of each subscriber station may also need adaptation to the method of the present invention, in particular to provide for sending messages to a base station outside its cell where this is required. Moreover, a subscriber station in a peer-to-peer network could itself carry out the method of the present invention.

The invention may also be embodied as one or more device or apparatus programs (e.g. computer programs and computer program products) for carrying out part or all of the methods described herein. Such programs embodying the present invention may be stored on computer-readable media, or could, for example, be in the form of one or more signals. Such signals may be data signals downloadable from an Internet website, or provided on a carrier signal, or in any other form.

Various modifications are possible within the scope of the present invention.

The invention has been described with reference to TD-LTE, but could also be applied other TDD based wireless communication systems like WiMAX-TDD. In other systems such as WiMAX, different terms may be used to refer to signals serving the same functions as described above in relation to LTE, for example the sounding reference signal.

The two embodiments in the invention proposal may be used in conjunction in a heterogeneous wireless system (HetNet). The first embodiment can be applied to bigger cells (Macro, Micro eNB) who can perform the complex SVD, and the second embodiment can be applied to simpler smaller cells (e.g.: Femto eNB).

Reference has been made to "cell-edge" users. It should be noted, however, that a method of the invention is applicable to any user experiencing high interference whether or not physically located at a nominal cell edge, so long as that user is capable of being handed over to another cell. For example, such a user may be located physically in the middle of a cell, yet experiencing high interference does to a "canyon" effect.

In general, in embodiments, where an optimal solution is sought a suboptimal choice may nevertheless be made if the needs of scheduling or other needs demand it, without departing from the principles of this invention. This includes, in the variation of the second embodiment as already mentioned, not applying the present invention in the event that cell A users already have difficulty in achieving satisfactory download data rates.

The embodiments may be combined in the same base station. For example an eNB which might have the processing ability for SVD in accordance with the first embodiment may choose to implement the second embodiment in an instance where the load on the base station's processor is already high.

The above description refers to a "base station" as carrying out the techniques of the present invention, but in general the present invention can be applied to any transmitter capable of communicating with multiple users in a wireless communication system including a relay station, a subscriber station in a peer-to-peer network, etc. The term "base station" as used in the claims should accordingly be given a broad interpretation.

Figure 5:
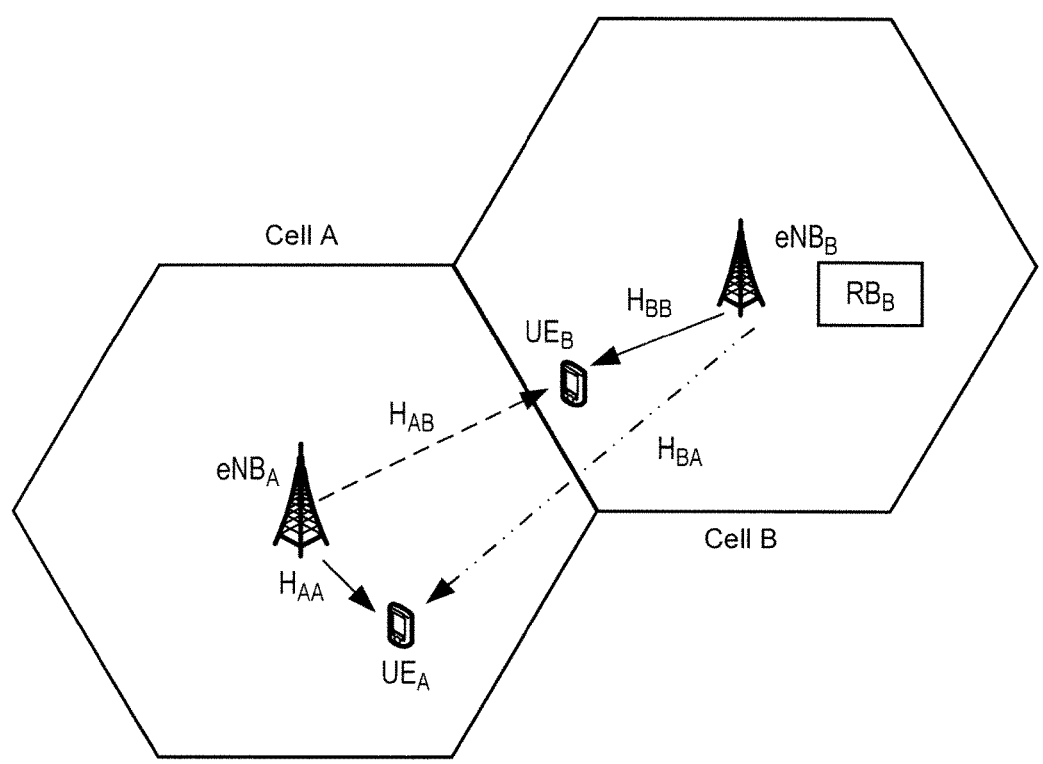
FIG. 5 is a schematic diagram of an interference scenario to which the present invention may be applied.

The arrangement of cells need not be as schematically shown in FIG. 5 with Cell A adjacent to Cell B. Instead, the cells provided by the base station may be partly or even wholly overlapping. This would be the case in a heterogeneous network. In such a scenario, $eNB_A$ might be a macro base station whilst $eNB_B$ could be a femto station (Home eNB) for example.

Moreover, although a one-to-one relationship between eNBs and cells has been assumed for the sake of simplicity, this is not essential.

INDUSTRIAL APPLICABILITY

MIMO pre-coding for interference cancellation can remove significant interference faced by cell edge users, in a LTE-FDD system where no specific channel knowledge is available at the eNB and the pre-coder is selected through a best-fit approximation to the limited codebook entries. In Release 10 TD-LTE systems, however, this channel knowledge can be extracted through reciprocity and the best pre-coder can be used, without the limitations of a codebook. This can provide significantly better interference cancellation than in the LTE-FDD case. With optimal precoder selection and in-cell user selection, the interference cancellation gains can be increased, and the potential loss of throughput for the in-cell user can be more effectively compensated to arrive at net throughput gains.

The TD-LTE variant of LTE has drawn significant interest in Far East and developing economies and it is likely that TD-LTE systems will be deployed before conventional LTE-FDD systems in these countries. Hence this invention proposal provides an improved interference cancellation option for these networks.

What is claimed is:

1. A time-division duplex wireless communication method in which a first base station uses multiple antenna ports in multiple-input multiple-output communication with terminals in a first cell, the multiple-input multiple-output communications to the terminals being performed with application of a respective precoder, the method comprising, in the first base station:
   determining information about a multiple-input multiple-output channel between the first base station and a first terminal;
   transmitting data to the first terminal via the channel;
   detecting that the first terminal is subject to interference from a second cell;
   storing information about the channel and handing over the first terminal to the second cell;
   obtaining information on a resource allocation to the first terminal in the second cell;
   finding an interference-reducing precoder on a basis of the information about the channel;
   selecting a second terminal in the first cell with which to precode communications by the interference-reducing precoder; and
   performing wireless communications with the second terminal with application of the interference-reducing precoder and using another resource allocation in the first cell which includes said resource allocation to the first terminal in the second cell.

2. The method according to claim 1, wherein determining information about the multiple-input multiple-output channel comprises measuring a sounding reference signal transmitted from the first terminal to the first base station.

3. The method according to claim 1, further comprising the first base station transmitting a user equipment specific reference signal to each terminal with application of the respective precoder for informing the first terminal of the precoder.

4. The method according to claim 1, wherein the detecting comprises the first terminal reporting to the first base station that a measurement of signal quality falls below a predetermined threshold.

5. The method according to claim 1, wherein the second cell is provided by a second base station and the obtaining comprises the first base station receiving an indication of the resource allocation from the second base station.

6. The method according to claim 1, wherein:
   the determining information about the multiple-input multiple-output channel comprises deriving a channel matrix of the channel;
   the transmitting comprises performing singular-value decomposition on a derived channel matrix to obtain a signal space matrix and a null space singular matrix and using the signal space matrix as the precoder;
   the storing and finding comprise storing the null space singular matrix and using the null space singular matrix as the interference-reducing precoder; and
   the selecting comprises selecting, as the second terminal, a terminal among all terminals in the first cell having a highest achievable capacity of communication from the first base station using the interference-reducing precoder.

7. The method according to claim 1, wherein:
   the determining information about the multiple-input multiple-output channel comprises receiving, from the first terminal, a sounding reference signal, and an indication of a preferred precoder among a set of precoders in a codebook;
   the transmitting comprises using the preferred precoder, indicated by the first terminal, as the precoder;
   the storing comprises storing the channel determined from measuring the sounding reference signal; and
   the finding comprises selecting, as the interference-reducing precoder, a precoder among a set of precoders in a codebook for which an interference value with the channel is a minimum.

8. The method according to claim 7, further comprising the first terminal searching the codebook for a precoder allowing a highest achievable capacity of communication from the first base station.

9. The method according to claim 1, applied to an Long Term Evolution-based wireless communication system, wherein the first base station employs Long Term Evolution Transmission Mode 9 for wireless communications to the terminals.

10. The method according to claim 1, wherein the first base station disposes of a first number of antenna ports greater than a second number of antenna ports of each terminal.

11. A wireless communication system, comprising:
one or more base stations forming first and second cells; and
a plurality of terminals served by the cells;
the one or more base stations arranged to allocate resources to, and wirelessly communicate with, terminals served by the first and second cells, and to perform wireless communications with the terminals by precoding in accordance with a precoder,
wherein a first base station of the one or more base stations comprises a control unit arranged to:
determine information about a multiple-input multiple-output channel between the first base station and a first terminal;
transmit data to the first terminal via the channel;
detect that the first terminal is subject to interference from a second cell;
store the information about the channel and hand over the first terminal to the second cell;
obtain information on a resource allocation to the first terminal in the second cell;
find an interference-reducing precoder on a basis of the stored information about the channel;
select a second terminal in the first cell with which to precode communications by the interference-reducing precoder; and
perform wireless communications with the second terminal with application of the interference-reducing precoder and using another resource allocation in the first cell which includes said resource allocation to the first said terminal in the second cell.

12. The wireless communication system according to claim 11, wherein a second base station provides the second cell, and the first base station is arranged to obtain from the second base station said information on a resource allocation to the first said terminal in the second cell.

13. A base station in a wireless communication system in which a plurality of terminals are served by first and second cells, the base station providing at least said first cell and arranged to allocate resources to terminals and to perform wireless communications with terminals by precoding in accordance with a precoder, the base station having a processor arranged to:

determine information about a multiple-input multiple-output channel between the first base station and a first terminal;
transmit data to the first terminal via the channel;
detect that the first terminal is subject to interference from a second cell;
store information about the channel and handing over the first terminal to the second cell;
obtain information on a resource allocation to the first terminal in the second cell;
find an interference-reducing precoder on a basis of the stored information about the channel;
select a second terminal in the first cell with which to precode communications by the interference-reducing precoder; and
perform wireless communications with the second terminal with application of the interference-reducing precoder and using another resource allocation in the first cell which includes said resource allocation to the first terminal in the second cell.

14. The base station according to claim 13, wherein the processor is arranged to operate in accordance with a method in which a first base station uses multiple antenna ports in multiple-input multiple-output communication with terminals in a first cell, the multiple-input multiple-output communications to the terminals being performed with application of a respective precoder, the method comprising, in the first base station:
determining information about a multiple-input multiple-output channel between the first base station and a first terminal;
transmitting data to the first terminal via the channel;
detecting that the first terminal is subject to interference from a second cell;
storing information about the channel and handing over the first terminal to the second cell;
obtaining information on a resource allocation to the first terminal in the second cell;
finding an interference-reducing precoder on a basis of the information about the channel;
selecting a second terminal in the first cell with which to precode communications by the interference-reducing precoder; and
performing wireless communications with the second terminal with application of the interference-reducing precoder and using another resource allocation in the first cell which includes said resource allocation to the first terminal in the second cell.

15. Non-transitory computer-readable recording media storing a program which, when executed by a processor of a base station, performs the method of claim 1.

* * * * *